April 19, 1927.
E. MULLINS ET AL
1,625,136
CAR WHEEL CLAMP
Filed Oct. 22, 1926
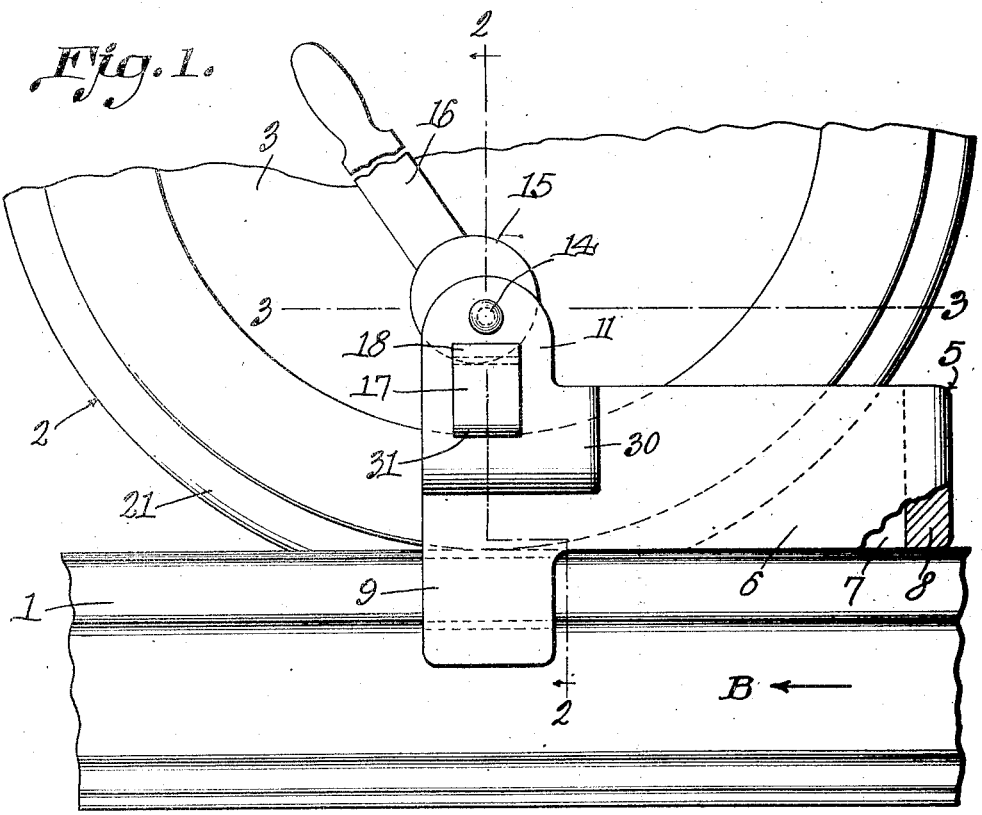
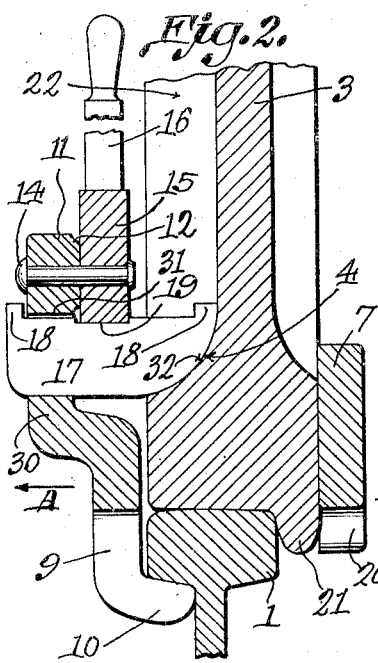
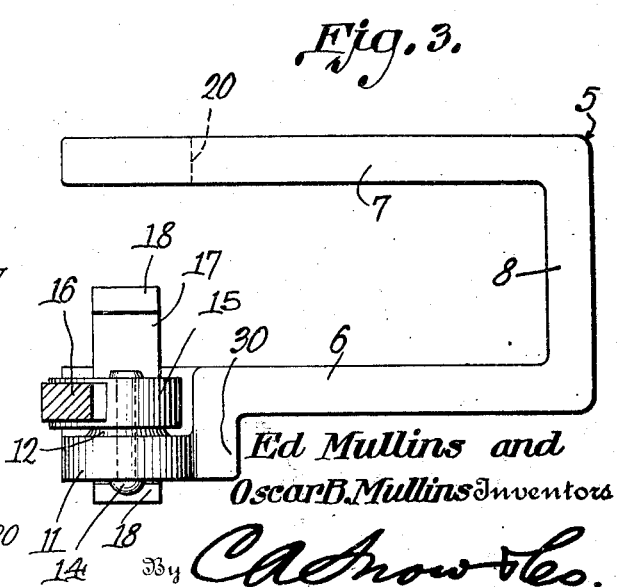
Ed Mullins and
Oscar B. Mullins Inventors
By C A Snow & Co.
Attorneys Patented Apr. 19, 1927.

1,625,136

UNITED STATES PATENT OFFICE.

ED MULLINS, OF CINCINNATI, OHIO, AND OSCAR B. MULLINS, OF SOUTH COVINGTON, KENTUCKY, ASSIGNORS OF ONE-FOURTH TO THOMAS EDWIN MULLINS AND ONE-FOURTH TO ARCH MULLINS, BOTH OF SOUTH COVINGTON, KENTUCKY.

CAR-WHEEL CLAMP.

Application filed October 22, 1926. Serial No. 143,436.

The object of this invention is to provide a clamp for holding a car wheel against movement with respect to a rail, whilst a jack is being used to take the weight from the journals of a car during the renewing of the interchangeable bearings or brasses.

So far as we know, car wheel clamps as at present made, either are so constructed that they will often slip off the wheel when the jack is put into operation: or else they are held down in place by the jack, as a part of the jack stand.

The clamp forming the subject matter of this application simply may be slid longitudinally of the rail into engagement with the wheel and be held there by a simple cam lever or its equivalent, it being impossible for the clamp to move horizontally out of engagement with the wheel and the rail, or to move vertically out of engagement with the wheel and the rail, when the jack is put to work.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 shows, in side elevation, a portion of a railroad rail, and a car wheel, held against relative movement by the clamp which forms the subject matter of this application, parts being broken away;

Figure 2 is a section taken about on the line 2—2 of Figure 1, parts being broken away and parts appearing in elevation;

Figure 3 is a section taken about on the line 3—3 of Figure 1, the car wheel and the rail being omitted.

The numeral 1 marks the head of a railroad rail, and the numeral 2 marks the wheel of a car, the wheel being adapted to roll along the rail. The wheel 2 has a thinned central web 3 which forms a circumferential shoulder 4 in the wheel, and this shoulder 4, is invariably curved or concaved, as shown in Fig. 2 and is not at right angles to the plane in which the wheel is located. Owing to this peculiar construction of the shoulder, which is a standard detail, the ordinary clamp for holding the wheel fixed with respect to the rail will very often slide off, in the direction of the arrow A, in Figure 2, when the jack is put into operation during the renewal of brasses. The foregoing being understood, this application proposes and offers a car wheel clamp which will remain in place, in engagement with the wheel and the rail, notwithstanding the concaved form of the shoulder 4, disclosed in Figure 2.

The clamp includes a U-shaped rigid body 5 made up of an outer arm 6, an inner arm 7, and a connection 8 joining the arms, the arms preferably being located in parallel relation, and the connection being disposed approximately at right angles to the arms. The outer arm 6 is supplied at its free end with a depending extension 9, located at right angles to the arm 6, and having an inwardly prolonged finger 10 which is disposed at an angle to the extension 9, the finger 10 being so located that it will engage with the under surface of the head or ball 1 of the rail, as shown in Figure 2. The outer arm 6 is provided at its upper corner with an off-set portion 30, having an opening 31. A lug 11 extends upwardly from the part 30, the lug being provided with an inwardly extended boss 12, and through the boss 12 and the lug 11 extends a support 14, preferably a rivet, on which is mounted to swing an eccentric 15 on the inner end of a lever 16, of any desired length, the eccentric 15 operating within the off-set portion 30 of the outer arm 6. The numeral 17 designates the movable member in the form of a slide, mounted to reciprocate in the opening 31, and having a limited tilting movement therein, the member 17 being equipped at its ends with projections 18 which limit the movement of the member 17 in the opening 31. In its upper edge, the movable member or slide 17 has a seat 19 wherewith the edge of the eccentric 15 is adapted to engage. The inner end edge of the slide 17 is convexedly rounded, as at 32, to correspond to the concavity of the shoulder 4. The inner arm 7 of the clamp is of approximately the same length as the outer arm 6, and is supplied at its free end with a short depending projection 20, located at right angles to the arm 7 and opposite to the extension 9.

In practical operation, the clamp is slid to the left, on the ball 1 of the rail, in the direction of the arrow B in Figure 1, the eccentric 15 being out of engagement with the slide 17, and the slide being retracted from the position shown in Figure 2, it being evident that if the slide were not retracted from the position of Figure 2, it could not clear the edge of the wheel and pass into the concavity 22 in the side of the wheel. The finger 10 engages beneath the ball 1 of the rail, and, when the clamp is in the proper position, the slide 17 is moved to the right in Figure 2 until the end edge 32 of the slide is on the shoulder 4 of the car wheel. Then, the eccentric 15 is operated by means of the handle or lever 16, and the eccentric pushes the slide 17 tightly against the shoulder 4 of the car wheel, the car wheel thus being clamped to the rail, because the slide 17 engages the shoulder 4, and because the finger 10 engages the under edge of the ball 1 of the rail. As thus far described, the clamp will bind down the wheel 2 on the rail, but something more than this is required, in order that the clamp may not slip off the shoulder 4 in the direction of the arrow A of Figure 1. Here note that the inner arm 7 extends around behind the car wheel 2 and prevents the clamp from moving in the direction of the arrow A, the projection 20 extending down to the lower edge of the flange 21 of the car wheel, and aiding in holding the clamp in place, against transverse movement.

The device is characterized by extreme simplicity and high efficiency. It is to be distinguished clearly from clamps which form part of the stand for the lifting jack, and from clamps which require the jacking up of the car wheel before they can be mounted in place and put into operation.

Owing to the fact that the eccentric 15 is received in the seat 19 of the slide 17, the slide is positively held against movement to the left in Figure 2, and in engagement with the shoulder 4.

What is claimed is:—

1. A wheel clamp of the class described, comprising a U-shaped body including inner and outer arms, the outer arm being supplied with spaced parts for engaging a wheel and a rail, one of said parts being movable, to bring about a clamping action, the inner arm being a wheel-engaging member which prevents the clamp from moving horizontally out of working position.

2. A wheel clamp of the class described, comprising a U-shaped body including inner and outer arms, the outer arm having a rail-engaging means, a movable wheel-engaging slide carried by the outer arm and cooperating with said means to form a grip, and an eccentric mounted to swing on the outer arm and cooperating with the slide to move it toward said means.

3. A wheel clamp of the class described, comprising a U-shaped body including inner and outer arms, the outer arm having a rail-engaging means, a movable wheel-engaging slide carried by the outer arm and cooperating with said means to form a grip, and an eccentric mounted to swing on the outer arm and cooperating with the slide to move it toward said means, the slide being provided with a seat in which the eccentric is received, to hold the slide against movement to inoperative position.

In testimony that we claim the foregoing as our own, we have hereunto set our hands.

ED. MULLINS.
OSCAR B. MULLINS.